United States Patent [19]

Agrawal et al.

[11] Patent Number: 5,513,497
[45] Date of Patent: May 7, 1996

[54] SEPARATION OF FLUID MIXTURES IN MULTIPLE DISTILLATION COLUMNS

[75] Inventors: Rakesh Agrawal, Emmaus; Jianguo Xu, Fogelsville, both of Pa.

[73] Assignee: Air Products and Chemicals, Inc., Allentown, Pa.

[21] Appl. No.: 375,927

[22] Filed: Jan. 20, 1995

[51] Int. Cl.$^6$ .................................................. F25B 9/00
[52] U.S. Cl. .................................. 62/651; 62/915; 62/646
[58] Field of Search .................................. 62/24, 25, 38, 62/39, 41

[56] References Cited

U.S. PATENT DOCUMENTS

| | | | |
|---|---|---|---|
| 4,224,045 | 9/1980 | Olszewski et al. | 62/30 |
| 5,081,845 | 1/1992 | Allam et al. | 62/24 |
| 5,205,127 | 4/1993 | Agrawal | 62/24 |
| 5,230,217 | 7/1993 | Agrawal et al. | 62/22 |
| 5,231,837 | 8/1993 | Ha | 62/24 |
| 5,251,451 | 10/1993 | Agrawal et al. | 62/25 |
| 5,257,504 | 11/1993 | Agrawal et al. | 62/24 |
| 5,295,356 | 3/1994 | Billy | 62/40 |
| 5,341,646 | 8/1994 | Agrawal et al. | 62/25 |

OTHER PUBLICATIONS

Westerberg, A. W., "The Synthesis of Distillation–Based Separation systems", in Computers and Chemical Engineering, vol. 9, No. 5, pp. 421–429, 1985, Article.
Carlberg, N. A., Westerberg, A. W., "Temperature–Heat Diagrams for Complex Columns.2. Underwood's Method for Side Strippers and Enrichers" in Ind. Eng. Chem. Res. 1989, 28, pp. 1379–1386.

Primary Examiner—Ronald C. Capossela
Attorney, Agent, or Firm—John M. Fernbacher

[57] ABSTRACT

A fluid mixture is separated by distillation in a two column system in which the feed is prefractionated in a first column having at least one separation stage above the feed and the prefractionator bottoms provides feed to a second column operating at a lower pressure. Cooling for condensing the overhead vapor of the first column is provided by heat exchange with flashed prefractionator bottoms or with an intermediate fluid in the second column. The two-column system is readily combined with a high pressure column in a three-column distillation system for separating air which is particularly useful for integration with a gasification combined cycle combustion turbine system. Optionally, three nitrogen products can be produced at three different pressures.

35 Claims, 7 Drawing Sheets

PREFRACTIONATOR COLUMN     MAIN COLUMN

SEPARATION OF FLUID MIXTURES IN MULTIPLE DISTILLATION COLUMNS

TECHNICAL FIELD

The invention pertains to the separation of fluid mixtures by multiple distillation columns, and in particular to the separation of air and the integration of the air separation process with a combustion turbine.

BACKGROUND OF THE INVENTION

Distillation is an important method for the separation of fluid mixtures in industries such as petroleum refining, organic and inorganic chemicals production, and the separation of atmospheric gases. Distillation is an energy intensive process, especially in the separation of low-boiling gas mixtures associated with cryogenic air separation, nitrogen rejection from natural gas, synthesis gas separation, and the separation of light hydrocarbons. In these separations, mechanical or electrical energy is utilized to supply the large amounts of driving force required to operate the separation equipment at temperatures far below ambient. It is desirable to improve the energy efficiency in such separations in order to improve the economics of recovering low-boiling gas products.

Improved separation of such low-boiling mixtures has been achieved in the art by the use of multiple heat-integrated distillation columns. For example, in many cryogenic air separation processes two columns are operated at different pressures and are thermally linked such that condensing vapor at the top of the higher pressure column provides heat through indirect heat exchange for vapor boilup at the bottom of the lower pressure column. Such a method requires that the temperature difference between the heat source provided at the bottoms reboiler of the higher pressure column and the refrigeration provided to remove heat at the top condenser of the lower pressure column be much greater than the same temperature difference in a single column distillation process. Double-column distillation systems are well-known and widely used in the cryogenic separation of air.

The use of a high pressure column with a low pressure column to reduce heat duty in distillation has been studied extensively in the art. Representative descriptions of such systems are given by A. W. Westerberg in a review article entitled "The Synthesis of Distillation-Based Separation Systems" in *Computers and Chemical Engineering* Vol. 9, No. 5, pp. 421–429, 1985 and in an article by N. A. Carlberg and A. W. Westerberg entitled "Temperature-Heat Diagrams for Complex Columns. 2. Underwood's Method for Side Strippers and Enrichers" in *Ind. Eng. Chem. Res.* 1989, 28, pp. 1379–1386. A characteristic of the systems described in these articles is that heat duty in the distillation columns is reduced by providing heat to the higher pressure column at a higher temperature and heat to the lower pressure column at a lower temperature. This characteristic results in the operation of the higher pressure column at temperatures greater than the temperatures in the lower pressure column.

Cryogenic air separation systems can be integrated readily with combustion turbines, particularly in combination with the generation of electric power in combined cycle processes. The combustion turbine air compressor can provide compressed air for the turbine combustor as well as for the air separation system, and pressurized waste gas (typically nitrogen-rich) from the air separation system can be introduced into the combustor or expansion turbine to recover pressure energy and increase the overall system efficiency. Double-column air separation systems have been integrated with combustion turbines as disclosed in representative U.S. Pat. Nos. 4,224,045, 5,081,845, 5,251,451, and 5,257,504.

Further improvement to the efficiency of cryogenic air separation systems can be realized by utilizing three integrated columns operating at three different pressures. Such systems are particularly useful when oxygen and/or nitrogen products are required at elevated pressures. U.S. Pat. No. 5,231,837 discloses a triple column air separation system in which an intermediate pressure column operates between the high and low pressure columns. The intermediate pressure column is a stripping column fed at the top with partially vaporized liquid from the bottom of the high pressure column; reboiler duty to the intermediate pressure column is supplied by indirect heat exchange with vapor from the top of the high pressure column. Vaporized bottoms and flashed overhead condensate from the intermediate pressure column are fed to the low pressure column. A low pressure oxygen product, a high pressure nitrogen product, and a low pressure nitrogen product are recovered from the process. The process optionally is integrated with a combustion turbine wherein the two nitrogen product streams are compressed and introduced into the turbine combustor.

U.S. Pat. No. 5,341,646 discloses a triple column air separation system in which feed to the intermediate pressure column is provided by both the overhead and bottom streams from the high pressure column and by a stream of cooled and partially condensed air. The intermediate column contains both rectification and stripping sections, and reboiler duty to the column is provided by compressed overhead vapor from the high pressure column.

The potential for efficiency improvement in the separation of low-boiling gases is particularly favorable when the feed composition is such that the mole fraction of the desired lighter (more volatile) component to be recovered is significantly different from that of the desired heavier (less volatile) component to be recovered from the feed mixture, and when the products are required at elevated pressures. This combination of conditions is particularly applicable, for example, to air separation systems which supply oxygen at elevated pressures to hydrocarbon gasification processes operated in conjunction with combined cycle power generation systems. Multiple-column air separation systems with increased operating efficiency are desirable for use with such combined cycle power generation systems, and an improved triple-column air separation system for such an application is described in the following specification and appended claims.

SUMMARY OF THE INVENTION

The invention is a method for separating a fluid mixture containing at least one more volatile component and at least one less volatile component in which the fluid mixture is introduced at a first pressure as a first feed stream into a first distillation column having at least one separation stage above the feed point, and withdrawing from the column a first overhead vapor and a first bottoms liquid. The first bottoms liquid is flashed to a second pressure, and the resulting flashed first bottoms stream is fed to a second distillation column. A second overhead vapor enriched in the more volatile component and a second bottoms liquid enriched in the less volatile component are withdrawn from the second column. At least a portion of the first overhead vapor is condensed, and at least a portion of the resulting first condensate is returned to the first column as reflux. The cooling duty for condensing the first overhead vapor is provided by indirect heat exchange with either (1) fluid at an intermediate point in the second column or (2) at least a portion of the resulting flashed first bottoms stream prior to the second distillation column.

Either (1) the temperature at the bottom of the first column is equal to the temperature at the bottom of the second column and the temperature at any other point in the first column is between the highest and lowest temperatures in the second column or (2) the temperature at any point in the first column is between the highest and lowest temperatures in the second column. No temperature in the first column is greater than the highest temperature or less than the lowest temperature in the second column. Typically the combined molar flow rate of the first and second overhead vapors is more than 50% of the molar flow rate of the first feed stream.

Alternatively, an intermediate product consisting of a portion of the first condensate, a portion of the first overhead vapor, or portions of the first condensate and the first overhead vapor can be withdrawn from the first column. In this embodiment, the total molar flow rate of the first and second overhead vapors and the intermediate product is more than 50% of the molar flow rate of the first feed stream. A portion of the first condensate can be flashed and introduced into the second column at a location above the point at which the flashed first bottoms stream is introduced. Preferably, the more volatile component is nitrogen and the less volatile component is oxygen.

In another general embodiment of the invention, a fluid mixture containing at least one more volatile component and at least one less volatile component is separated by introducing the fluid mixture at a first pressure as a first feed stream into a first distillation column having at least one separation stage below the feed point, and withdrawing therefrom a first overhead vapor and a first bottoms liquid. The first overhead vapor is condensed and least a portion of the resulting first condensate is returned to the first column as reflux; the remaining portion of the first condensate is pumped to a second pressure and introduced into a second distillation column. A second overhead vapor enriched in the more volatile component and a second bottoms liquid enriched in the less volatile component are withdrawn from the second column. Either (1) the temperature at the top of the first column is equal to the temperature at the top of the second column and the temperature at any other point in the first column is between the highest and lowest temperatures in the second column or (2) the temperature at any point in the first column is between the highest and lowest temperatures in the second column. No temperature in the first column is greater than the highest temperature or less than the lowest temperature in the second column. Typically the molar flow rate of the second overhead vapor is less than 50% of the molar flow rate of the first feed stream.

In a specific embodiment of the invention, the first and second columns are operated in combination with a third distillation column wherein the first column operates as an intermediate pressure column, the second column operates as a low pressure column, and the third column operates as a high pressure column. The low, intermediate, and high pressure columns operate in a cycle in which a compressed feed stream containing oxygen and nitrogen, essentially free of additional components which would freeze in the cycle, is cooled to near its dew point. The feed optionally contains some argon. The resulting stream is fed into the high pressure column, and a high pressure vapor overhead and a high pressure bottoms liquid are withdrawn from the column. The high pressure bottoms liquid is cooled and flashed, and the flashed stream is fed into the intermediate pressure column at a point such that there is at least one separation stage above the feed. An intermediate pressure overhead vapor and an intermediate pressure bottoms liquid are withdrawn from the intermediate pressure column. The intermediate pressure bottoms liquid is flashed, and the resulting flashed stream is fed into the low pressure column at a point below the top of the column; a nitrogen-rich overhead vapor product is withdrawn from the low pressure column. Optionally, the intermediate pressure bottoms liquid is cooled before flashing. An oxygen-enriched product is withdrawn from the bottom of said low pressure column. Optionally, a portion of the high pressure overhead vapor can be withdrawn as a high pressure nitrogen-rich product. A portion of the intermediate pressure overhead vapor can be recovered as an intermediate pressure nitrogen-rich product.

In a further embodiment, the separation process described above is utilized to separate air and is integrated with a combined cycle combustion turbine system. An air stream is compressed to a first pressure, a portion of the resulting pressurized air is combusted with fuel in a combustor, and the resulting combustion products are passed through an expansion turbine to produce shaft power; at least a portion of the shaft power drives a compressor to compress the air. Another portion of the resulting pressurized air is treated to remove essentially all impurities which would freeze in the air separation cycle, thereby providing the compressed feed air stream containing oxygen and nitrogen described earlier. The low pressure nitrogen-rich overhead vapor product is warmed to near ambient temperature, compressed to the first pressure, and combined with the portion of pressurized air at the first pressure prior to said combustor. In this manner the pressure energy in the low pressure nitrogen-rich product is recovered in the expansion turbine.

Alternatively, a portion of the intermediate pressure overhead vapor is recovered as an intermediate pressure nitrogen-rich product which is warmed, compressed, and combined with the first compressed nitrogen-rich stream and the portion of pressurized air prior to the combustor. In this manner the pressure energy in the low pressure and intermediate pressure nitrogen-rich products is recovered in the expansion turbine. In another alternative embodiment, a portion of the high pressure overhead vapor is recovered as a high pressure nitrogen-rich product which is warmed, compressed, and combined with the other two nitrogen-rich product streams and the portion of pressurized air prior to said combustor. In this manner the pressure energy in all three nitrogen-rich products is recovered in the expansion turbine.

In a variation of the above embodiment, air is separated in a three-column distillation system in which the overhead vapor from the intermediate pressure column is condensed by heat exchange with a flashed bottoms stream from the same column, and the resulting flashed stream is fed to the low pressure column. The three-column distillation system can be integrated with a combined cycle combustion turbine system in manner analogous to that discussed above.

DETAILED DESCRIPTION OF THE INVENTION

The invention is an improved method for the separation of fluid mixtures, particularly low-boiling gas mixtures, by the use of integrated multiple distillation columns. In the most general embodiment of the invention, a multicomponent fluid mixture is initially separated in a prefractionation column followed by further fractionation in a second column, and the two columns are linked thermally in various configurations. The two columns can be integrated further with additional distillation columns. The multicomponent feed mixture is typically a vapor-liquid mixture from which a lighter or more volatile component and a heavier or less volatile component are recovered as products enriched in the respective components. For example, the more volatile component can be nitrogen and the less volatile component can be methane, wherein these components are recovered from nitrogen-light hydrocarbon mixtures in petroleum production. In another application, the more volatile component is nitrogen and the less volatile component is oxygen, for example in the cryogenic separation of air. The method of the present invention can be applied to other types of mixtures, but is particularly well-suited for the separation of low-boiling gases at below-ambient temperatures requiring large amounts of refrigeration. Typically the total molar flow rate of the product(s) enriched in the more volatile component is greater than 50% of the molar flow rate of the multicomponent feed mixture.

Figure 1:
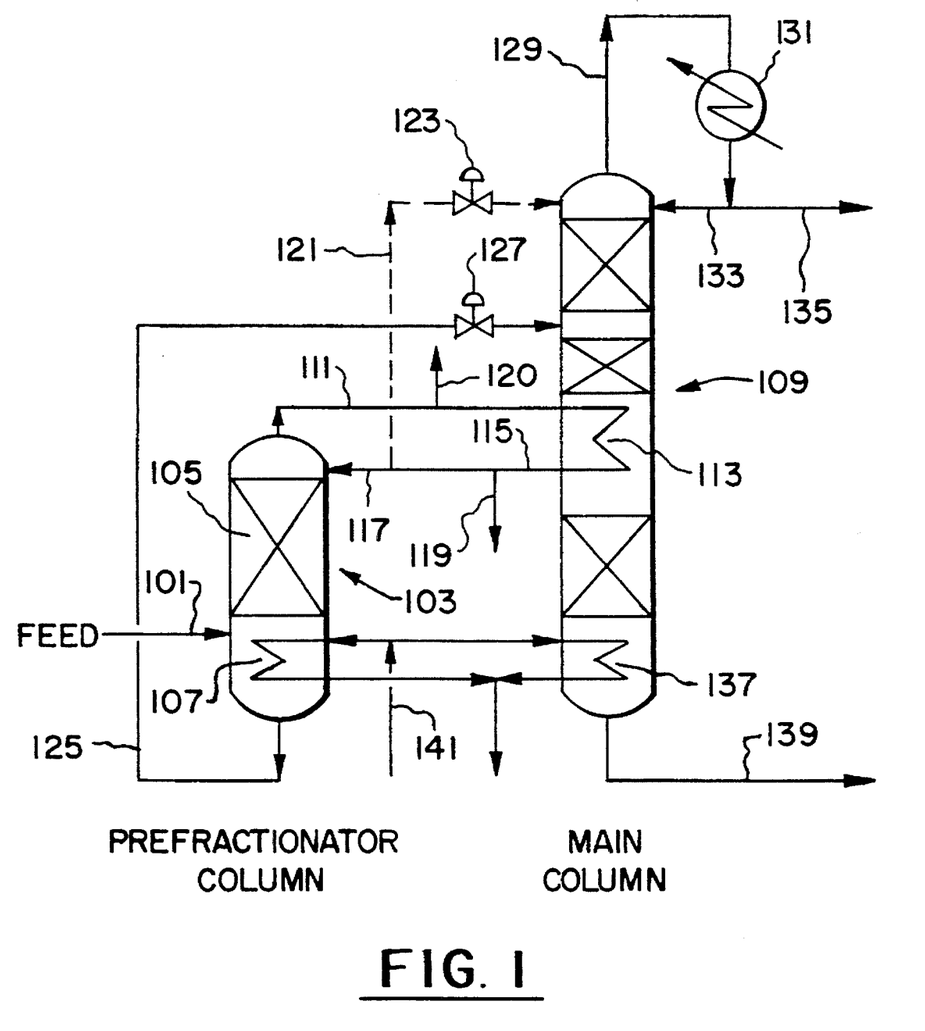
FIG. 1 is a flow diagram of a general embodiment of the present invention.

The first embodiment of the invention utilizing two fractionation columns is illustrated in FIG. 1. Feed 101 is introduced into prefractionator column 103 which contains one or more separation stages in rectification section 105 above the feed point and reboiler section 107 below the feed point. Prefractionator column 103 is operated in combination with main distillation column 109, wherein column 103 operates at a higher pressure than column 109. Either (1) the temperature at the bottom of column 103 is equal to the temperature at the bottom of column 109 and the temperature at any other point in column 103 is between the highest and lowest temperatures in column 109 or (2) the temperature at any point in column 103 is between the highest and lowest temperatures in column 109. No temperature in column 103 is greater than the highest temperature or less than the lowest temperature in column 109. At least a portion of overhead vapor 111 is condensed by indirect heat exchange with liquid in exchanger 113 in the stripping section of column 109, and at least a portion of condensate 115 is returned as reflux 117 to column 103. A liquid product 119 enriched in the more volatile component optionally can be withdrawn as desired from condensate 115. Optionally a portion 120 of overhead vapor 111 can be recovered as a vapor product. If desired, both liquid product 119 and vapor product 120 can be withdrawn. Optionally a portion 121 of condensate 115 is flashed or reduced in pressure across expansion valve 123 and introduced into the top section of column 109 either at the top or a few stages below the top of the column. Liquid bottoms stream 125 is flashed across expansion valve 127 and introduced into column 109 at an intermediate point. Overhead vapor 129 from column 109 is condensed in condenser 131, a portion 133 of the condensate is returned to the column as reflux, and a portion is withdrawn as overhead product 135 which is enriched in the desired more volatile component in feed 101. Bottoms liquid product 139, which is enriched in the desired less volatile component, is withdrawn from column 109. Boilup vapor for column 109 is provided by reboiler section 137. Heat for reboiler sections 107 and 137 can be provided in common by warm stream 141, or alternatively a separate heat source can be provided for each reboiler. Optionally, column 103 can have one or more stages in a stripping section below the feed point. Alternatively, a portion of feed 101 can bypass column 103 and pass directly into main column 109. Typically the total molar flow rate of one or more product streams 119, 120, and 135 (which are enriched in the more volatile component) is greater than 50% of the molar flow rate of feed 101.

Figure 2:
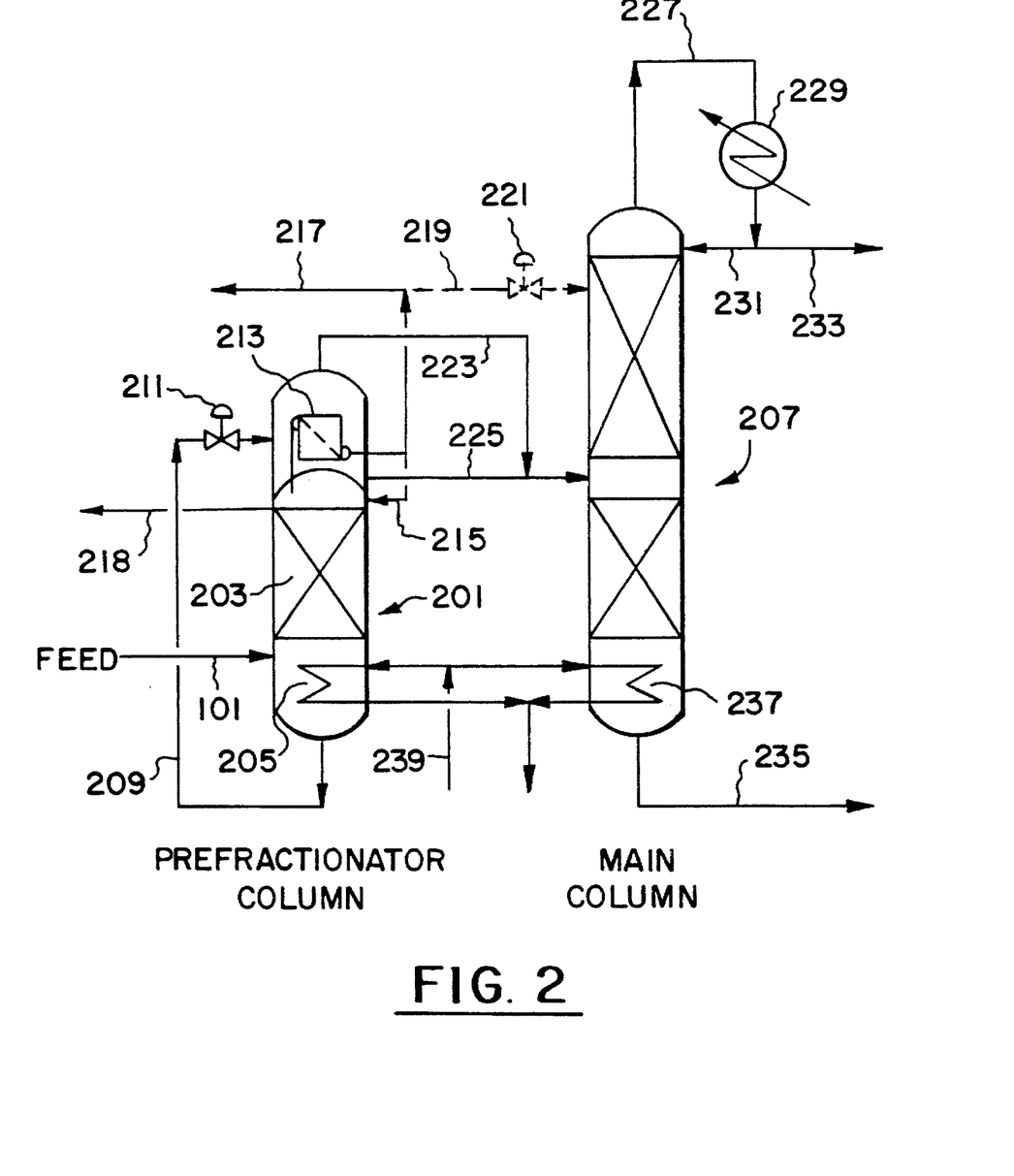
FIG. 2 is a flow diagram of an alternative general embodiment of the present invention.

A second embodiment of the invention is illustrated in FIG. 2. Feed 101 is introduced into prefractionator column 201 which contains one or more separation stages in rectification section 203 above the feed point and reboiler section 205 below the feed point. Prefractionator column 201 is operated in combination with main distillation column 207, wherein column 201 operates at a higher pressure than column 207. Either (1) the temperature at the bottom of column 201 is equal to the temperature at the bottom of column 207 and the temperature at any other point in column 201 is between the highest and lowest temperatures in column 207 or (2) the temperature at any point in column 201 is between the highest and lowest temperatures in column 207. No temperature in column 201 is greater than the highest temperature or less than the lowest temperature in column 207. Bottoms stream 209, which is enriched in the desired less volatile component in feed 101, is flashed across expansion valve 211 and at least a portion of the flashed stream is introduced into condenser section 213 in which overhead vapor from column 201 is condensed by indirect heat exchange with the flashed bottoms stream. A portion 215 of the resulting condensate provides reflux to column 201, and another portion 217 can be withdrawn as desired as intermediate product 217 which is enriched in the desired more volatile component. Optionally, vapor product 218 can be withdrawn from column 201. If desired, both intermediate product 217 and vapor product 218 can be withdrawn. Optionally, another portion 219 of the condensate can be flashed across expansion valve 221 and introduced into column 207. Alternatively, no product 217 is withdrawn. Vapor 223 and liquid 225 from the boiling side of condenser section 213 are combined and introduced into column 207 at an intermediate point. Overhead vapor 227 from column 207 is condensed in condenser 229, a portion 231 of the condensate is returned to the column as reflux, and a portion withdrawn as overhead product 233 which is further enriched in the desired more volatile component in feed 101. Bottoms liquid product 235, which is enriched in the desired less volatile component, is withdrawn from column 207. Boilup vapor for column 207 is provided by reboiler section 237. Heat for reboiler sections 205 and 237 can be provided in common by warm stream 239, or alternatively a separate heat source can be provided for each reboiler. Optionally, column 201 can have one or more stages in a stripping section below the feed point, but in such an option rectification section 203 typically will have more stages than the optional stripping section. Optionally, a portion of feed 101 can bypass column 203 and pass directly into main column 207. Typically the total molar flow rate of one or more product streams 217, 218, and 233 (which are enriched in the more volatile component) is greater than 50% of the molar flow rate of feed 101.

Figure 3:
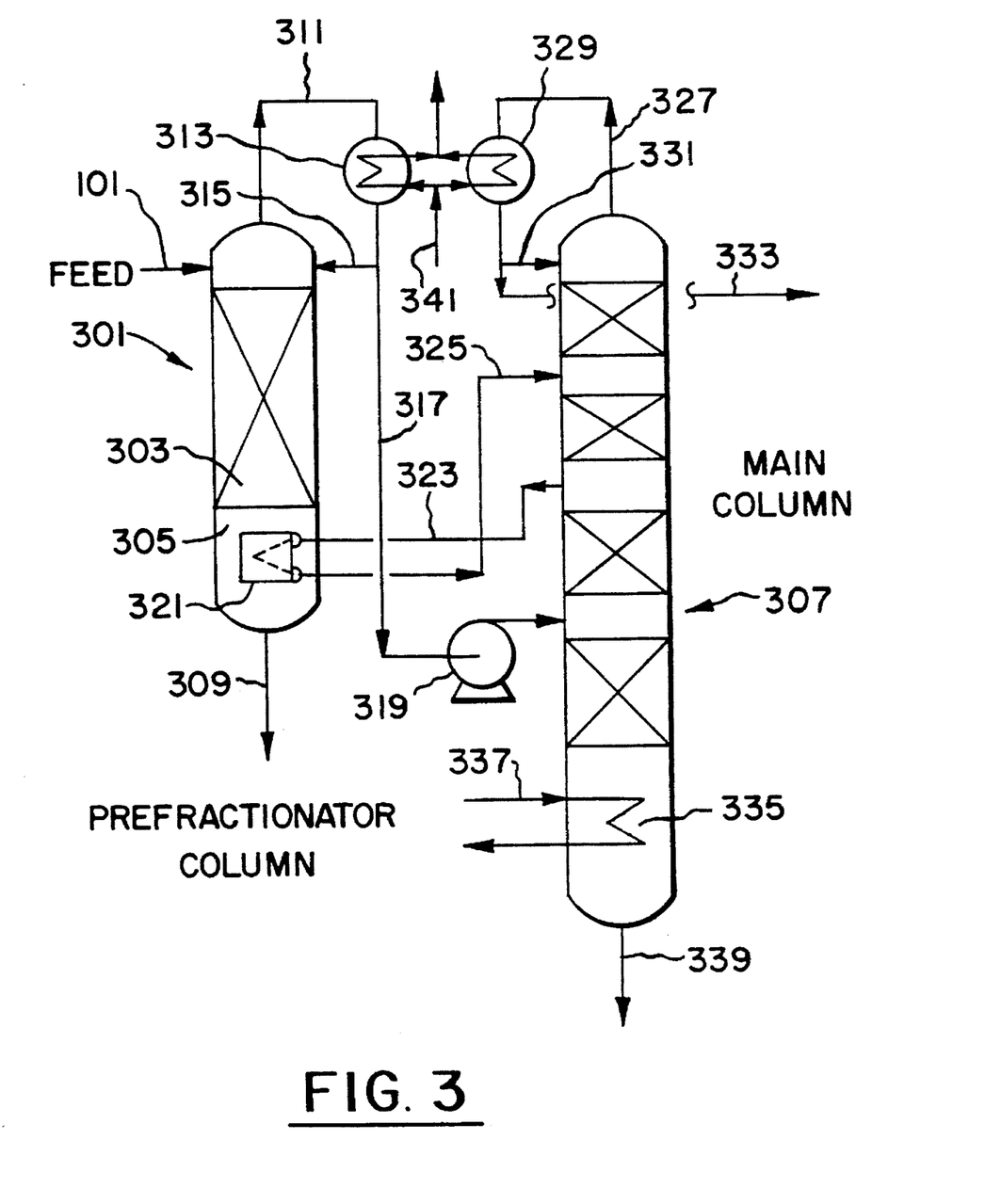
FIG. 3 is a flow diagram of another alternative general embodiment of the present invention.

An alternative embodiment of the invention is shown in FIG. 3. Feed 101 is introduced into prefractionator column 301 which contains one or more separation stages in stripping section 303 below the feed point and reboiler section 305 at the bottom of the column. Prefractionator column 301 is operated in combination with main distillation column 307, wherein column 301 operates at a lower pressure than column 307. Either (1) the temperature at the top of column 301 is equal to the temperature at the top of column 307 and the temperature at any other point in column 301 is between the highest and lowest temperatures in column 307 or (2) the temperature at any point in column 301 is between the highest and lowest temperatures in column 307. No temperature in column 301 is greater than the highest temperature or less than the lowest temperature in column 307.

Bottoms stream 309, which is enriched in the desired less volatile component in feed 101, is withdrawn as product from column 301. Overhead vapor from column 301 is condensed in condenser 313, a portion 315 of the resulting condensate is returned to column 301 as reflux, and another portion 317 is pumped to a higher pressure by pump 319 and fed into column 307 at an intermediate point. Boilup in reboiler section 305 is provided by reboiler 321 which utilizes warmer intermediate vapor stream 323 from column 307 which is returned to column 307 as partially or totally condensed stream 325. Overhead vapor 327 from column 307 is condensed in condenser 329, a portion 331 of the resulting condensate is returned to column 307 as reflux, and the remainder 333 is withdrawn as overhead product 333 which is enriched in the desired more volatile component in feed 101. Boilup vapor for column 307 is provided in reboiler section 335 by warm stream 337, and bottoms liquid product stream 339 is withdrawn which is enriched in the desired less volatile component in feed 101. If bottoms stream 309 of prefractionator column 301 contains a higher concentration of the desired more volatile component than bottoms stream 339, then at least a portion of bottoms 309 can be pumped and introduced into the stripping section of column 307. Common cooling for condensers 313 and 329 is provided by refrigerant stream 341; alternatively condensers 313 and 329 can be operated with separate refrigeration streams. Optionally, column 301 can have one or more stages in a rectification section above the feed point. Typically the molar flow rate of the product enriched in the more volatile component, i.e. stream 333, is less than 50% of the molar flow rate of feed 101.

The general embodiments of the invention described above are particularly useful for the separation of low-boiling gas mixtures, for example in the separation of air to recover oxygen and/or nitrogen products. The first embodiment of the invention as discussed above with reference to FIG. 1 is utilized integrated separation process shown in FIG. 4. Compressed feed 401 at a pressure of at least 50 psia containing oxygen and nitrogen, preferably air which has been compressed and subjected to pretreatment by known methods to remove essentially all contaminants which would freeze at cryogenic temperatures, is cooled and at least partially condensed against cold process streams in heat exchange zone 402 to yield cold high pressure feed 403. Refrigeration to the separation system is provided for example by compressing, cooling, and expanding a portion 404 of compressed feed 401 in compander system 405 to provide a cold low pressure feed 406. Alternate arrangements are known in the art for providing refrigeration to the system for sufficient cooling of high pressure feed 403, and the present invention is not limited to any specific refrigeration method.

Figure 4:
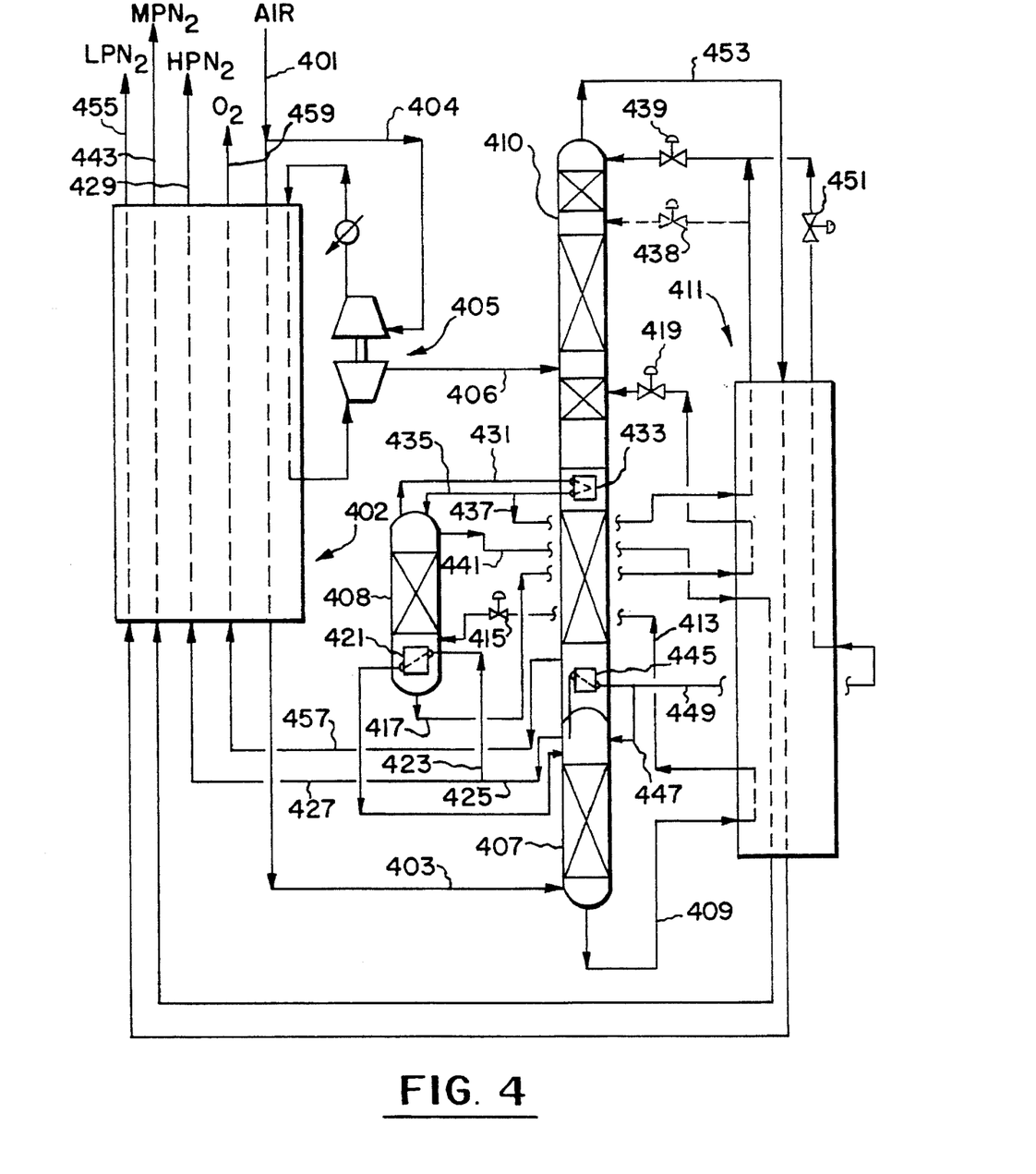
FIG. 4 is a flow diagram of an embodiment of the present invention as applied to the separation of air in a three-column system.

The separation system of FIG. 4 comprises a high pressure distillation column 407, medium pressure fractionation column 408, and low pressure distillation column 410. Columns 407, 408, and 410 are fitted with trays, structured packing, or combinations thereof to promote vapor-liquid contacting and mass transfer within the columns. Medium pressure column 408 corresponds to prefractionator column 103 of FIG. 1 and low pressure column 410 corresponds to main column 109 of FIG. 1. The integration of columns 407,408, and 410 will be clear from the following process description. Cold high pressure feed 403 at a temperature near its dew point enters the bottom of high pressure column 407 and liquid bottoms stream 409 is withdrawn therefrom and cooled against cold process streams in heat exchange zone 411. Cold stream 413 is flashed or reduced in pressure across expansion valve 415 and enters medium pressure column 408 which contains one or more separation stages above the feed point. Liquid bottoms stream 417, which is enriched in oxygen, is cooled in heat exchange zone 411, flashed across expansion valve 419, and fed to an intermediate point of low pressure column 410. Boilup vapor for medium pressure column 408 is provided by indirect heat exchange in reboiler 421 with portion 423 of high pressure column vapor overhead 425. Another portion 427 is withdrawn and warmed in heat exchange zone 402 to yield high pressure nitrogen-rich product 429.

At least a portion of overhead vapor 431 from medium pressure column 408 is condensed in condenser 433 against liquid at an intermediate point in low pressure column 410, and portion 435 of the resulting condensate is returned to medium pressure column 408 as reflux. Another portion 437 of the resulting condensate is cooled in heat exchange zone 411, flashed across expansion valve 439, and fed as reflux at the top of low pressure column 410. Alternatively, condensate 437 can be warmed, flashed across expansion valve 438, and fed to column 410 at a point below the top of the column. Optionally, nitrogen-rich vapor 441 is withdrawn from medium pressure column 408, warmed in heat exchange zones 411 and 402, and withdrawn as medium pressure nitrogen-rich product 443. Overhead vapor from high pressure column 407 is condensed in reboiler-condenser 445 to provide boilup vapor in the bottom of low pressure column 410, and a portion 447 of the resulting condensate is returned to high pressure column 407 as reflux. Another portion 449 of the condensate is cooled in heat exchange zone 411, flashed across expansion valve 451, combined with medium pressure column condensate 437, and the combined stream is flashed across expansion valve 439 and fed into low pressure column 410.

Cold low pressure feed 406 is introduced into low pressure column 410 which provides direct refrigeration for the integrated three-column process. Nitrogen-rich vapor 453 is withdrawn from low pressure column 410, warmed in heat exchange zones 411 and 402, and withdrawn as low pressure nitrogen-rich product 455. Oxygen-rich vapor 457 is withdrawn from low pressure column 410, warmed in heat exchange zone 402, and withdrawn as oxygen-rich product 459. The integrated columns 407, 408, and 410 operate in the respective pressure ranges of 50–350, 30–250, and 15–150 psia, and at any given operating condition the pressure in the high pressure column is higher than the medium pressure column which in turn is higher that in the low pressure column. Either (1) the temperature at the bottom of medium pressure column 408 is equal to the temperature at the bottom of low pressure column 410 and the temperature at any other point in medium pressure column 408 is between the highest and lowest temperatures in low pressure column 410 or (2) the temperature at any point in medium pressure column 408 is between the highest and lowest temperatures in low pressure column 410. No temperature in medium pressure column 408 is greater than the highest temperature or less than the lowest temperature in low pressure column 410.

Figure 5:
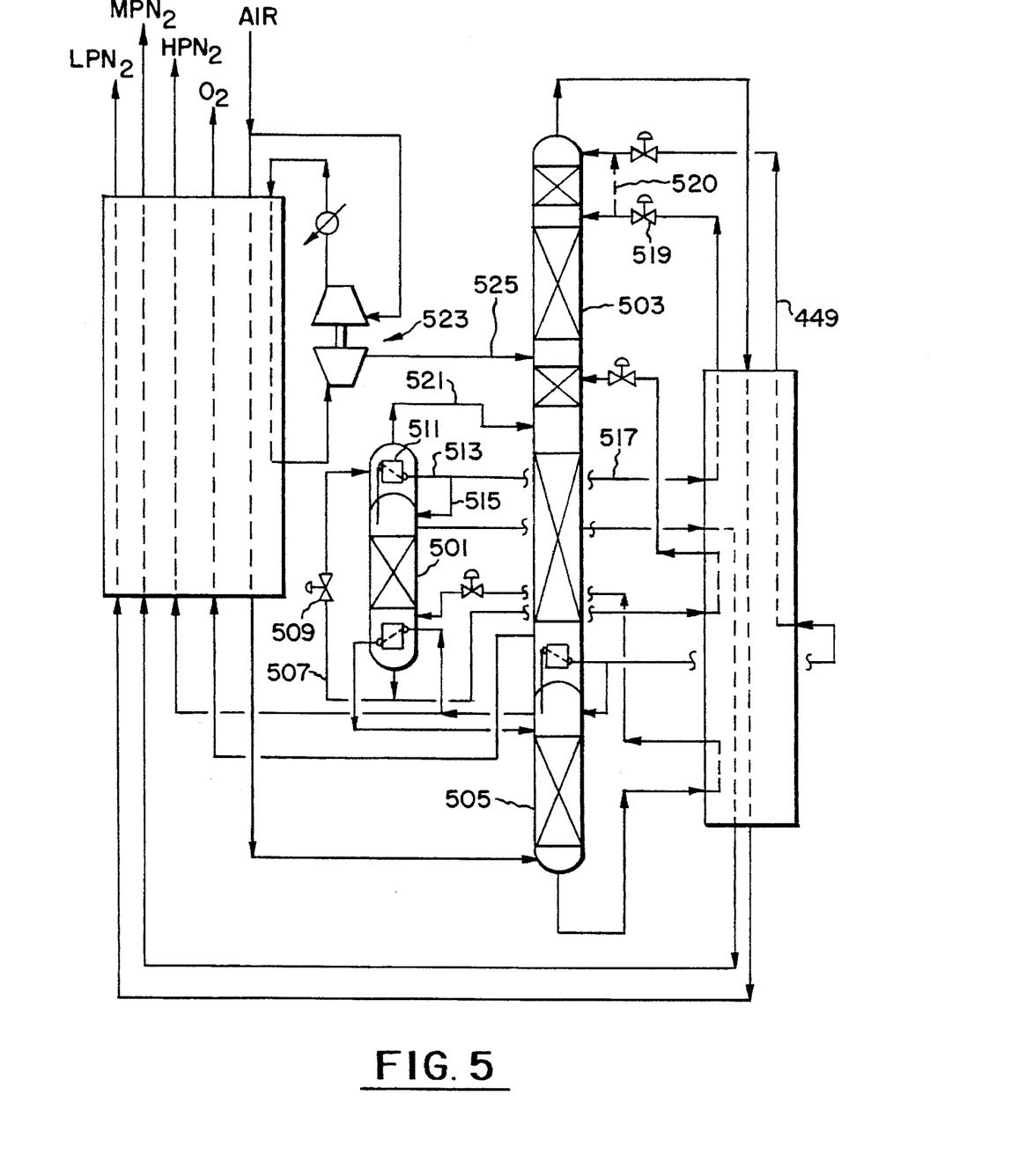
FIG. 5 is a flow diagram of another embodiment of the present invention as applied to the separation of air in a three-column system.

An alternative embodiment of the invention is given in FIG. 5, which is a modification of the process described above in reference to FIG. 4. One difference in this alternative embodiment compared with that of FIG. 4 is that reflux for the medium pressure column is provided in a different manner. A portion 507 of the liquid bottoms from medium pressure column 501 is flashed across expansion valve 509 and provides refrigeration for condenser 511 in which at least a portion of overhead vapor from medium pressure column 501 is condensed as condensate 513. A portion 515 of the condensate provides reflux to medium pressure column 501 and the remaining portion 517 is warmed, flashed across expansion valve 519, and fed as impure reflux to low pressure column 503. Optionally, the liquid flashed across valve 519 can be fed as stream 520 to the top of low pressure column 503. The warmed liquid bottoms, after providing refrigeration for condenser 511, is introduced as stream 521 to an intermediate point of low pressure column 503. The alternative process of FIG. 5 is the same as the process of FIG. 4 in all other respects. Either (1) the temperature at the bottom of medium pressure column 501 is equal to the temperature at the bottom of low pressure column 503 and the temperature at any other point in medium pressure column 501 is between the highest and lowest temperatures in low pressure column 503 or (2) the temperature at any point in medium pressure column 501 is between the highest and lowest temperatures in low pressure column 503. No temperature in medium pressure column 501 is greater than the highest temperature or less than the lowest temperature in low pressure column 503.

A number of alternatives are possible in the operation of the processes of FIGS. 4 and 5. Medium pressure column 408 and 501 are shown as rectification columns with one or more separation stages above the feed point; optionally these columns may include additional stages below the feed point. In FIG. 5, pure liquid nitrogen reflux optionally could be produced instead of impure reflux 517 and sent to the top of low pressure column 503 with reflux stream 449. Optionally, multiple reboilers could be used in low pressure columns 410 and 503 and/or medium pressure columns 408 and 501 to improve efficiency. In another option, liquid nitrogen can be produced by expansion of one or more of the pressurized nitrogen-rich product streams. In yet another option, compander 405 or 523 can be operated to produce expanded air stream 406 or 525 at a medium pressure, and this air feed can be introduced into the medium pressure column.

Figure 6:
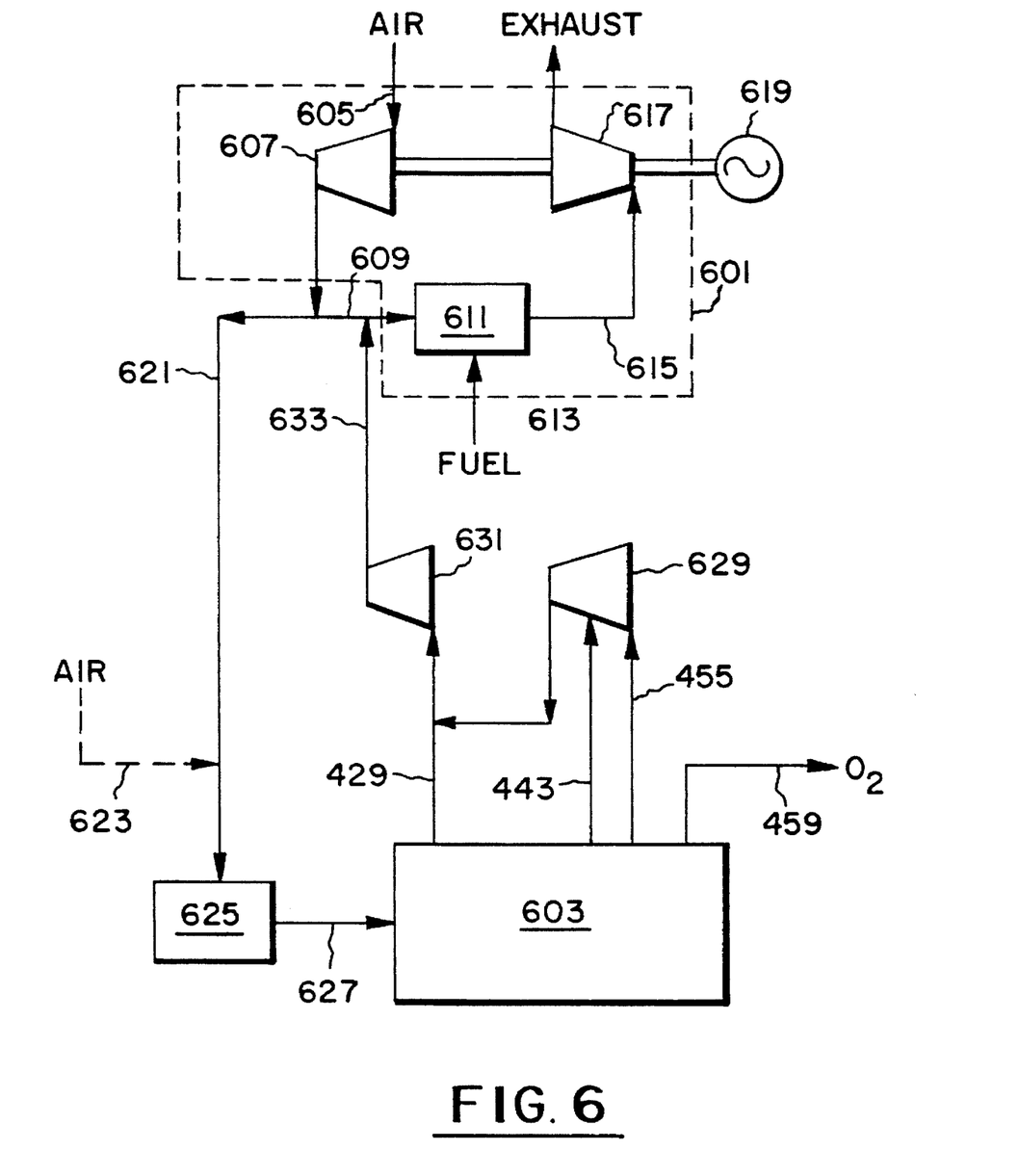
FIG. 6 is a block diagram showing the integration of the present invention with a combustion turbine system.

Either of the process cycles of FIGS. 4 and 5 can be integrated with a combustion turbine as used for example in a gasification combined cycle power generation system. FIG. 6 illustrates such an integration of gas turbine system 601 with cryogenic air separation system 603, wherein the air separation system operates according to the process of FIGS. 4 or 5. Air 605 is compressed by compressor 607, a portion 609 of the compressed air is reacted with fuel 613 in combustor 611, and the resulting hot, pressurized gas 615 is expanded in expansion turbine 617 to generate shaft power to drive compressor 607 and optionally electric generator 619. Another portion 621 of compressed air, optionally supplemented by auxiliary compressed air 623, is cooled and purified in front end cleanup system 625 wherein water, carbon dioxide, and other minor contaminants are removed by methods known in the art to eliminate freezing in air separation system 603. Purified compressed air feed 627 is separated therein as earlier discussed with reference to FIGS. 4 or 5, and oxygen product (typically greater than 80 vol % oxygen) is withdrawn for use for example in the gasification of carbonaceous material to produce fuel 613. Low pressure nitrogen 455, medium pressure nitrogen 443, and high pressure nitrogen 429 are withdrawn and utilized in combustion turbine system 601 to recover residual pressure energy in the nitrogen streams. This is accomplished by compressing low and medium pressure nitrogen steams in first stage compressor 629, the discharge of which is combined with high pressure nitrogen 429 in second stage compressor 631 to yield compressed nitrogen stream 633 which is combined with compressed air 609 to combustor 611. Alternatively, compressed nitrogen 633 can be introduced directly into combustor 611 or combined with hot, pressurized gas 615 prior to expansion turbine 617. Alternatively, only low pressure nitrogen 455 is produced and compressed in compressor 629. A combination of low pressure nitrogen 455 with intermediate pressure nitrogen 443 or high pressure nitrogen 429 can be produced if desired. Depending upon the operating pressures in air separation system 603 relative to combustion turbine system 601, only a single nitrogen compressor may be required.

EXAMPLE

To illustrate the advantage of using the triple column process of the present invention with combined cycle combustion turbine system of FIG. 6, the cycle of FIG. 4 of the present invention and the triple column process of earlier-cited U.S. Pat. No. 5,231,837 as illustrated in FIG. 7 were simulated by heat and mass balances using available simulation methods.

Referring to FIG. 6 and utilizing the air separation cycle in FIG. 4 of the present invention, 100 lbmol/hr of contaminant-free pressurized air feed 401 at 232 psia is separated to yield 21.9 lbmol/hr of oxygen 459 at 80.5 psia which is used in a gasification process (not shown) to generate fuel gas 613 for gas turbine system 601. Nitrogen product streams 429, 443, and 455 of FIG. 4 are produced at 77.6, 148.6, and 225.5 psia respectively. The three nitrogen streams are compressed by compressors 629 and 631 as shown to yield 78.1 lbmol/hr of pressurized nitrogen 633 at a 232 psia which is combined with combustion air 609 and introduced into combustor 611. Product purity requirements for operation with the combustion turbine system of FIG. 6 are oxygen at 95 vol % purity and nitrogen containing less than 1 vol % oxygen. Thus oxygen product 459 at 80.5 psia contains 95 vol % oxygen and nitrogen products 429, 443, and 455 contain less than 1 vol % oxygen.

Figure 7:
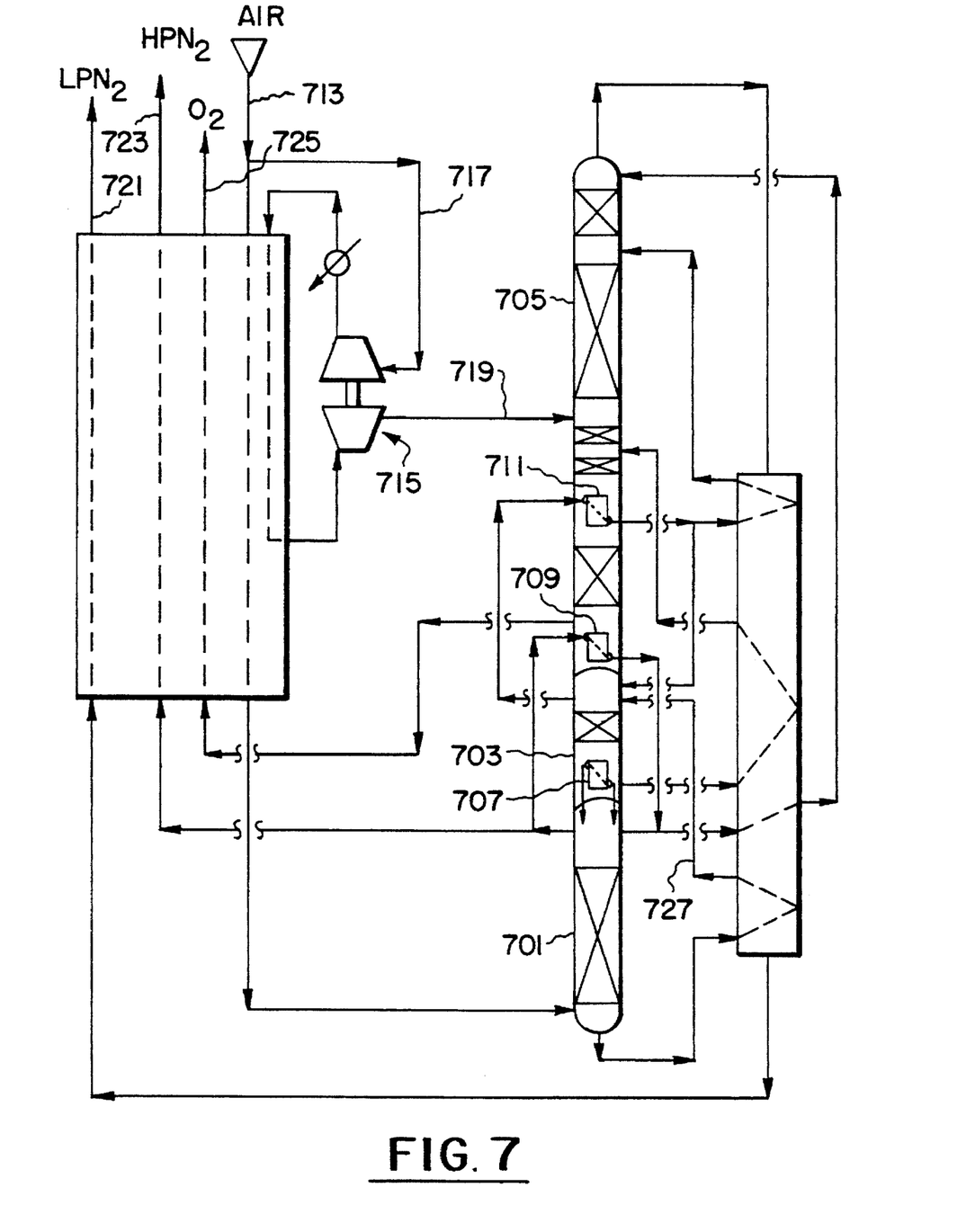
FIG. 7 is a flow diagram of a three-column air separation system according to the prior art.

The prior art triple column process of FIG. 7 utilizes high pressure column 701, intermediate pressure column 703, and low pressure column 705 which are thermally linked by reboiler-condensers 707, 709, and 711 respectively to separate 100 lbmol/hr of contaminant-free pressurized air feed 713 at 232 psia. Air compander system 715 operating on portion 717 of air feed 713 provides refrigeration to the system and cooled air stream 719 is fed to low pressure column 705. Nitrogen products 721 and 723 withdrawn from the system at 225.5 and 77.6 psia respectively; no intermediate pressure nitrogen is produced in this cycle. The two nitrogen streams are compressed as in FIG. 6 by compressors 629 and 631 to yield 78.1 lbmol/hr of pressurized nitrogen 633 at 232 psia which is combined with combustion air 609 and introduced into combustor 611. Oxygen product 725 at 80.5 psia contains 95 vol % oxygen and nitrogen products 721 and 723 contain less than 1 vol % oxygen.

The results of the simulation indicate the key difference between the method of the present invention as shown in FIG. 4 and the method of U.S. Pat. No. 5,231,837 as shown in FIG. 7, namely, the relative flow rates of the nitrogen product streams. The present invention produces 61.9 lbmol/hr of low pressure nitrogen at 77.6 psia, 15.0 lbmol/hr of medium pressure nitrogen at 148.4 psia, and 1.2 lbmol/hr of high pressure nitrogen at 225.5 psia. By comparison, the method of FIG. 7 produces 77.9 lbmol/hr of low pressure nitrogen at 77.6 psia and 0.2 lbmol/hr of high pressure nitrogen at 225.5 psia; no medium pressure nitrogen is produced. Both methods as applied to the combustion turbine cycle of FIG. 6 yield 78.1 lbmol/hr of pressurized nitrogen 633 at 232 psia which is combined with combustion air 609 and introduced into combustor 611. Both methods also provide 21.9 lbmol/hr of oxygen 459 at 80.5 psia.

The relative saving in total power required to provide pressurized nitrogen stream 633 and oxygen stream 459 for the present invention of FIG. 4 is readily calculated relative to the prior art method of FIG. 7 by $$RPS = \frac{[(1.2 - 0.2) \ln (225.5/77.6) + 15 \ln (148.4/77.6)]}{100 \ln (232/14.5)}$$

which yields a relative power saving (RPS) of 0.039 or 3.9% for the present invention of FIG. 4. In the above expression, the numerator is proportional to the incremental nitrogen compression power saved by the method of the present invention compared with the method of FIG. 7 and the denominator is proportional to the total compression power required to compress atmospheric feed air to 232 psia for the air separation methods of the present invention or FIG. 7.

This power saving is realized in the present invention chiefly because medium pressure nitrogen 441 of the required purity (i.e. containing less than 1 vol % oxygen) is withdrawn from medium pressure column 408, and this is possible because column 408 has one or more trays above feed 413. In the method of FIG. 7, however, a medium pressure nitrogen product of required purity is not possible because feed 727 enters medium pressure column 703 above the trays in that column. In addition, the method of the present invention produces more high pressure nitrogen than does the process of FIG. 7.

Thus the present invention offers an improved air separation system which is more efficient than prior art methods for integration with a combustion turbine cycle. The operation of an intermediate pressure column in which the feed enters below the trays allows the withdrawal of a relatively high purity intermediate nitrogen product stream which requires less recompression for introduction into the turbine combustor. In addition, the method of the present invention produces a larger flow of high-pressure nitrogen which results in a reduced flow of low pressure nitrogen requiring recompression prior to introduction into the combustor.

The essential characteristics of the present invention are described completely in the foregoing disclosure. One skilled in the art can understand the invention and make various modifications thereto without departing from the basic spirit thereof, and without departing from the scope of the claims which follow.

We claim:

1. A method for the separation of a fluid mixture containing at least one more volatile component and at least one less volatile component which comprises:

a) introducing said fluid mixture at a first pressure as a first feed stream into a first distillation column having at least one separation stage above the feed point and withdrawing therefrom a first overhead vapor and a first bottoms liquid;

b) flashing said first bottoms liquid to a second pressure, feeding the resulting flashed first bottoms stream to a second distillation column, and withdrawing therefrom a second overhead vapor enriched in said more volatile component and a second bottoms liquid enriched in said less volatile component; and c) condensing at least a portion of said first overhead vapor and returning at least a portion of the resulting first condensate to the first column as reflux, wherein the cooling duty for condensing said first overhead vapor is provided by indirect heat exchange with either (1) fluid at an intermediate point in said second column or (2) at least a portion of said resulting flashed first bottoms stream prior to said second distillation column;

wherein either (1) the temperature at the bottom of said first column is equal to the temperature at the bottom of said second column and the temperature at any other point in said first column is between the highest and lowest temperatures in said second column or (2) the temperature at any point in said first column is between the highest and lowest temperatures in said second column.

2. The method of claim 1 wherein the combined molar flow rate of said first and second overhead vapors is more than 50% of the molar flow rate of said first feed stream.

3. A method for the separation of a fluid mixture containing at least one more volatile component and one less volatile component which comprises:

a) introducing said fluid mixture at a first pressure as a first feed stream into a first distillation column having at least one separation stage above the feed point and withdrawing therefrom a first overhead vapor and a first bottoms liquid;

b) flashing said first bottoms liquid to a second pressure, feeding the resulting flashed first bottoms stream to a second distillation column, and withdrawing therefrom a second overhead vapor enriched in said more volatile component and a second bottoms liquid enriched in said less volatile component;

c) condensing at least a portion of said first overhead vapor and returning at least a portion of the resulting first condensate to the first column as reflux, wherein the cooling duty for condensing said first overhead vapor is provided by indirect heat exchange with either (1) fluid at an intermediate point in said second column or (2) at least a portion of said resulting flashed first bottoms stream prior to said second distillation column; and d) withdrawing one or more intermediate products consisting of a portion of said first condensate, a portion of said first overhead vapor, or portions of said first condensate and said first overhead vapor;

wherein either (1) the temperature at the bottom of said first column is equal to the temperature at the bottom of said second column and the temperature at any other point in said first column is between the highest and lowest temperatures in said second column or (2) the temperature at any point in said first column is between the highest and lowest temperatures in said second column.

4. The method of claim 3 wherein the combined molar flow rate of said first and second overhead vapors is more than 50% of the molar flow rate of said first feed stream.

5. The method of claim 1 wherein a portion of said first condensate is flashed and introduced into said second column at a location above the point at which said flashed first bottoms stream is introduced.

6. The method of claim 1 wherein boilup vapor is provided at the bottoms of said first and second columns by indirect heat exchange with portions of a common heating stream.

7. The method of claim 1 wherein said first column is operated at a higher pressure than said second column.

8. The method of claim 1 wherein said more volatile component is nitrogen and said less volatile component is methane.

9. The method of claim 1 wherein said more volatile component is nitrogen and said less volatile component is oxygen.

10. The method of claim 9 which further comprises operating said first and second columns in combination with a third distillation column wherein said first column operates as an intermediate pressure column, said second column operates as a low pressure column, and said third column operates as a high pressure column, wherein said low, intermediate, and high pressure columns operate in a cycle which includes the steps of:

d) cooling to a temperature near its dew point a compressed feed stream containing oxygen and nitrogen which is essentially free of additional components which would freeze in said cycle;

e) introducing the resulting stream of step d) into said high pressure column and withdrawing therefrom a high pressure vapor overhead and a high pressure bottoms liquid;

f) cooling and flashing said high pressure bottoms liquid, and feeding the resulting flashed stream to said intermediate pressure column as said first feed stream;

g) withdrawing from said intermediate pressure column an intermediate pressure overhead vapor as said first overhead vapor and an intermediate pressure bottoms liquid as said first bottoms liquid;

h) flashing said intermediate pressure bottoms liquid and introducing the resulting flashed stream into said low pressure column at a point below the top of said column, and withdrawing from said low pressure column a low pressure nitrogen-rich overhead vapor product; and i) recovering an oxygen-enriched product from the bottom of said low pressure column.

11. The method of claim 10 which further comprises withdrawing at least a portion of said high pressure overhead vapor as a high pressure nitrogen-rich product.

12. The method of claim 10 which further comprises condensing at least a portion of said high pressure overhead vapor by indirect heat exchange with boiling liquid in the bottom of said low pressure column and returning a portion of the resulting condensate to the top of said high pressure column as reflux.

13. The method of claim 12 which further comprises cooling and flashing another portion of said resulting condensate and introducing the resulting flashed stream into the top of said low pressure column.

14. The method of claim 10 which further comprises recovering a portion of said intermediate pressure overhead vapor as an intermediate pressure nitrogen-rich product.

15. The method of claim 11 which further comprises condensing at least a portion of said intermediate pressure overhead vapor by indirect heat exchange with fluid at an intermediate point in said low pressure column, and utilizing at least a portion of the resulting condensate as reflux for said intermediate pressure column.

16. The method of claim 15 which further comprises cooling another portion of said resulting condensate, flashing the resulting cooled condensate, and introducing the resulting flashed stream into the top of said low pressure column.

17. The method of claim 11 which further comprises utilizing another portion of said high pressure overhead vapor to provide heat by indirect heat exchange for boilup in the bottom of said intermediate pressure column.

18. The method of claim 10 which further comprises:

j) compressing an air stream in a compressor to a first pressure and combusting a portion of the resulting pressurized air with fuel in a combustor;

k) passing the resulting combustion products of step (j) through an expansion turbine to produce shaft power, and utilizing at least a portion of said shaft power to drive said compressor;

l) treating another portion of said resulting pressurized air to remove essentially all of said additional components which would freeze in said cycle, thereby providing said compressed feed stream containing oxygen and nitrogen of step (d);

m) warming and compressing said low pressure nitrogen-rich overhead vapor product to yield a first compressed nitrogen-rich stream at said first pressure; and n) combining said first compressed nitrogen-rich stream with said portion of resulting pressurized air at said first pressure prior to said combustor, whereby the pressure energy in said first compressed nitrogen-rich stream is recovered in said expansion turbine.

19. The method of claim 18 which further comprises recovering a portion of said intermediate pressure overhead vapor as an intermediate pressure nitrogen-rich product, warming and compressing said intermediate pressure nitrogen-rich product, and combining the resulting second compressed nitrogen-rich stream with said first compressed nitrogen-rich stream and said portion of resulting pressurized air at said first pressure prior to said combustor, whereby the pressure energy in said first and second compressed nitrogen-rich streams is recovered in said expansion turbine.

20. The method of claim 18 which further comprises recovering at least a portion of said high pressure overhead vapor as a high pressure nitrogen-rich product, warming and compressing said high pressure nitrogen-rich product, and combining the resulting third compressed nitrogen-rich stream with said first compressed nitrogen-rich stream and said portion of resulting pressurized air at said first pressure prior to said combustor, whereby the pressure energy in said first and third compressed nitrogen-rich streams is recovered in said expansion turbine.

21. The method of claim 19 which further comprises recovering at least a portion of said high pressure overhead vapor as a high pressure nitrogen-rich product, warming and compressing said high pressure nitrogen-rich product, and combining the resulting third compressed nitrogen-rich stream with said first and second compressed nitrogen-rich streams and said portion of resulting pressurized air at said first pressure prior to said combustor, whereby the pressure energy in said first, second, and third compressed nitrogen-rich streams is recovered in said expansion turbine.

22. The method of claim 9 which further comprises operating said first and second columns in combination with a third distillation column wherein said first column operates as an intermediate pressure column, said second column operates as a low pressure column, and said third column operates as a high pressure column, wherein said low, intermediate, and high pressure columns operate in a cycle which includes the steps of:

d) cooling to near its dew point a compressed feed stream containing oxygen and nitrogen which is essentially free of additional components which would freeze in said cycle;

e) introducing the resulting stream of step d) into said high pressure column and withdrawing therefrom a high pressure vapor overhead and a high pressure bottoms liquid;

f) cooling and flashing said high pressure bottoms liquid, and feeding the resulting flashed stream to said intermediate pressure column as said first feed stream;

g) withdrawing from said intermediate pressure column an intermediate pressure overhead vapor as said first overhead vapor and an intermediate pressure bottoms liquid as said first bottoms liquid;

h) flashing a portion of said intermediate pressure bottoms liquid and utilizing the resulting flashed stream by indirect heat exchange to condense at least a portion of said intermediate pressure overhead vapor, thereby warming and at least partially vaporizing said flashed stream, and providing at least a portion of the resulting condensed stream as reflux to said intermediate pressure column;

i) feeding the resulting warmed and vaporized flashed stream of step (h) to said low pressure column and withdrawing from said low pressure column a low pressure nitrogen-rich product; and j) withdrawing an oxygen-enriched product from the bottom of said low pressure column.

23. The method of claim 22 which further comprises withdrawing at least a portion of said high pressure overhead vapor overhead as a high pressure nitrogen-rich product.

24. The method of claim 22 which further comprises cooling and flashing another portion of said intermediate pressure bottoms liquid and introducing the resulting flashed stream into said low pressure column below the top of said column.

25. The method of claim 22 which further comprises utilizing another portion of said high pressure overhead vapor to provide heat by indirect heat exchange for boilup at the bottom of said intermediate pressure column.

26. The method of claim 22 which further comprises recovering a portion of said intermediate pressure overhead vapor as an intermediate pressure nitrogen-rich product.

27. The method of claim 22 which further comprises:

j) compressing an air stream in a compressor to a first pressure and combusting a portion of the resulting pressurized air with fuel in a combustor;

k) passing the resulting combustion products of step (j) through an expansion turbine to produce shaft power, and utilizing at least a portion of said shaft power to drive said compressor;

l) treating another portion of said resulting pressurized air to remove essentially all of said additional components which would freeze in said cycle, thereby providing said compressed feed stream containing oxygen and nitrogen of step (d);

m) warming and compressing said low pressure nitrogen-rich overhead vapor product to yield a first compressed nitrogen-rich stream at said first pressure; and n) combining said first compressed nitrogen-rich stream with said portion of resulting pressurized air at said first pressure prior to said combustor, whereby the pressure energy in said first compressed nitrogen-rich stream is recovered in said expansion turbine.

28. The method of claim 27 which further comprises recovering a portion of said intermediate pressure overhead vapor as an intermediate pressure nitrogen-rich product, warming and compressing said intermediate pressure nitrogen-rich product, and combining the resulting second compressed nitrogen-rich stream with said first compressed nitrogen-rich stream and said portion of resulting pressurized air at said first pressure prior to said combustor, whereby the pressure energy in said first and second compressed nitrogen-rich stream is recovered in said expansion turbine.

29. The method of claim 27 which further comprises recovering at least a portion of said high pressure overhead vapor as a high pressure nitrogen-rich product, warming and compressing said high pressure nitrogen-rich product, and combining the resulting third compressed nitrogen-rich stream with said first compressed nitrogen-rich stream and said portion of resulting pressurized air at said first pressure prior to said combustor, whereby the pressure energy in said first and third compressed nitrogen-rich streams is recovered in said expansion turbine.

30. The method of claim 27 which further comprises recovering at least a portion of said high pressure overhead vapor as a high pressure nitrogen-rich product, warming and compressing said high pressure nitrogen-rich product, and combining the resulting third compressed nitrogen-rich stream with said first and second compressed nitrogen-rich streams and said portion of resulting pressurized air at said first pressure prior to said combustor, whereby the pressure energy in said first, second, and third compressed nitrogen-rich streams is recovered in said expansion turbine.

31. A method for the separation of a fluid mixture containing at least one more volatile component and at least one less volatile component which comprises:

a) introducing said fluid mixture at a first pressure as a first feed stream into a first distillation column having at least one separation stage below the feed point, and withdrawing therefrom a first overhead vapor and a first bottoms liquid;

b) condensing said first overhead vapor and returning at least a portion of the resulting first condensate to the first column as reflux, pumping the remaining portion of said first condensate to a second pressure, and introducing the resulting pressurized condensate into a second distillation column; and c) withdrawing from said second column a second overhead vapor enriched in said more volatile component and a second bottoms liquid enriched in said less volatile component;

wherein either (1) the temperature at the top of said first column is equal to the temperature at the top of said second column and the temperature at any other point in said first column is between the highest and lowest temperatures in said second column or (2) the temperature at any point in said first column is between the highest and lowest temperatures in said second column.

32. The method of claim 31 wherein the molar flow rate of said second overhead vapor is less than 50% of the molar flow rate of said first feed stream.

33. The method of claim 31 wherein heat to provide boilup vapor in the bottom of said first column is obtained by indirect heat exchange with intermediate fluid from said second column.

34. The method of claim 31 which further comprises condensing said second overhead vapor and utilizing a portion of the resulting condensate as reflux for said second column, wherein cooling for condensing said first and second overhead vapors is provided by portions of a common cooling stream.

35. The method of claim 31 said first bottoms liquid is withdrawn as an intermediate product.

* * * * *